United States Patent
Bontu et al.

(10) Patent No.: US 7,894,724 B2
(45) Date of Patent: Feb. 22, 2011

(54) METHOD AND APPARATUS FOR IMPROVING DUAL-POLARIZATION OPTICAL COMMUNICATION PERFORMANCE

(75) Inventors: Chandra Bontu, Nepean (CA); Leo Strawczynski, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1256 days.

(21) Appl. No.: 11/094,396

(22) Filed: Mar. 31, 2005

(65) Prior Publication Data
US 2006/0228116 A1 Oct. 12, 2006

(51) Int. Cl.
*H04B 10/00* (2006.01)
(52) U.S. Cl. .................... 398/152; 398/65; 398/68; 398/77; 398/78
(58) Field of Classification Search ............ 398/152, 398/65, 66, 67, 68, 77, 78
See application file for complete search history.

(56) References Cited

U.S. PATENT DOCUMENTS

| | | | | |
|---|---|---|---|---|
| 5,175,640 A * | 12/1992 | Eng et al. | ............. | 398/47 |
| 5,424,863 A * | 6/1995 | Gertel | ............. | 398/152 |
| 6,137,810 A * | 10/2000 | Bjurel et al. | ............. | 370/509 |
| 6,144,711 A * | 11/2000 | Raleigh et al. | ............. | 375/347 |
| 6,228,823 B1 * | 5/2001 | Morinaga et al. | ............. | 510/175 |
| 6,229,824 B1 * | 5/2001 | Marko | ............. | 370/477 |
| 6,366,390 B1 | 4/2002 | King et al. | | |
| 6,757,860 B2 * | 6/2004 | Choi et al. | ............. | 714/757 |
| 6,901,548 B2 * | 5/2005 | Hattori et al. | ............. | 714/755 |
| 7,149,432 B1 * | 12/2006 | Smith et al. | ............. | 398/158 |
| 7,437,082 B1 * | 10/2008 | Smith | ............. | 398/175 |
| 2002/0039211 A1 | 4/2002 | Shen et al. | | |
| 2002/0114358 A1 * | 8/2002 | Roberts et al. | ............. | 370/529 |
| 2003/0020985 A1 | 1/2003 | LaGasse et al. | | |
| 2004/0016874 A1 * | 1/2004 | Rao et al. | ............. | 250/225 |
| 2004/0208623 A1 * | 10/2004 | Kumar | ............. | 398/161 |
| 2006/0047842 A1 * | 3/2006 | McElwain | ............. | 709/231 |

FOREIGN PATENT DOCUMENTS

EP 0507508 7/1992

OTHER PUBLICATIONS

U.S. Appl. No. 09/722,339, filed Nov. 28, 2000.

* cited by examiner

*Primary Examiner*—Ken N Vanderpuye
*Assistant Examiner*—Hibret A Woldekidan
(74) *Attorney, Agent, or Firm*—Kent Daniels; Blake, Cassels & Graydon LLP

(57) ABSTRACT

A method and system for averaging the effects of polarization distortions across a multitude of transmitted data streams in a dual polarization multiplexed optical communications system. Data streams are interleaved amongst each other in accordance with a predetermined pattern. The interleaved data streams are symbol mapped and modulated to provide a pair of optical signals. The pair of optical signals are orthogonally polarized, and multiplexed for transmission across an optical fiber. A receiver circuit receives the transmitted signal and extracts the interleaved data streams. The interleaved data streams are de-interleaved to generate the original data streams. While the data streams can be interleaved and transmitted via a single wavelength optical signal, the data streams can be interleaved and transmitted over two or more different wavelength optical signals to further mitigate the effects of polarization distortions.

18 Claims, 14 Drawing Sheets

METHOD AND APPARATUS FOR IMPROVING DUAL-POLARIZATION OPTICAL COMMUNICATION PERFORMANCE

FIELD OF THE INVENTION

The present invention relates generally to optical communication systems. More particularly, the present invention relates to electrical domain mitigation of polarization distortions.

BACKGROUND OF THE INVENTION

Optical communications systems, including optical components and networking/data transmission components are configured for maximizing speed and capacity for data communications. Wavelength division multiplexing (WDM) has been used in optically amplified communications systems for combining a number of data channels in parallel in the same fibre. Hence, bandwidth has been effectively increased without the requirement of any significant modification to the system. Those of skill in the art will understand that a channel can be associated with a specific frequency or band of frequencies, where the information transmitted through the channel is represented by a data stream of encoded signals.

To further increase capacity of optical communications systems, consideration has been given to the technique called polarization multiplexing. Known methods applied to long haul transmission bit-rates of 40 Gbps over optical links, such as fibres, include quadrature phase shift keying (QPSK) and differentially coded QPSK (DQPSK), both being types of modulation. As those of skill in the art will understand, QPSK is a form of modulation in which a carrier is sent in one of four phases per symbol, such as at 45, 135, 225, and 315 degrees for example, encoding two bits per symbol. In DQPSK the change in phase from one symbol to the next encodes two bits per symbol.

In a conventional 40 Gbps dual-polarization system, four 10 Gbps channels are independently forward error correction (FEC) encoded, and each channel can carry a data stream. FIG. 1 is a block diagram of a prior art dual-polarization transmitter 10, which illustrates how a final optical signal $\lambda\_T$ is generated from four individual channels, carrying data streams a, b, c, d. As shown in FIG. 1, each data stream is error encoded via respective forward error correction (FEC) blocks 12. FEC is a well-known technique for effective data transmission error control.

Error encoded data streams a and b are provided by FEC's 12 to symbol mapping logic 14, while error encoded data streams c and d are provided by FEC's 12 to symbol mapping logic 16. The output of symbol mapping logic 14 is fed to modulator 18, and the output of symbol mapping logic 14 is fed to modulator 20. The output of modulators 18 and 20 are then provided to a horizontal polarizer 22 and a vertical polarizer 24, respectively. Horizontal polarizer 22 generates linearly (horizontally) polarized QPSK symbols. Vertical polarizer 24 generates orthogonally (vertically) polarized QPSK symbols.

Although by way of illustration, FIG. 1 shows horizontal and vertical polarizers 22 and 24 respectively, the key requirement is that the polarizers 22 and 24 be orthogonal. For example, the polarizers can generate orthogonal right and left circularly polarized light. The orthogonally polarized signals are combined by adder 26 and transmitted in a single wavelength signal $\lambda\_T$. The single wavelength signal $\lambda\_T$ is transmitted over an optical fibre cable to a conventional dual-polarization receiver, such as the dual-polarization receiver 30 shown in FIG. 2. It should be noted that symbol mapping logic 14/16, modulators 18/20, polarizers 22/24 and adder 26 form a signal processing block responsible for converting the outgoing data streams into an optical signal for transmission over an optical medium.

The single wavelength signal $\lambda\_T$ is transmitted over an optical fibre cable to a conventional dual-polarization receiver, such as the dual-polarization receiver 30 shown in FIG. 2. The receiver 32 receives the single wavelength signal $\lambda\_T$ to extract the orthogonal polarized QPSK symbols, and separate the four individual FEC encoded data streams from each other. Essentially, dual-polarization receiver 30 reverses the signal processing executed by dual-polarization transmitter 10.

The dual-polarization receiver 30 includes depolarizing circuit 32, optical-to-electrical converters 34/36, symbol de-mapping logic 38/40, and FEC decoder blocks 42. The depolarizing circuit 32 provides two symbol mapped output signals to optical-to-electrical converters 34 and 36. The electrical signals generated by optical-to-electrical converters 34 and 36 are provided to symbol de-mapping logic 38 and 40 respectively. Symbol de-mapping logic 38 provides a pair of FEC encoded data streams to its FEC decoders 42, to generate original data streams a and b, while symbol de-mapping logic 40 provides a pair of FEC encoded data streams to its FEC decoders 42, to generate original data streams c and d.

Polarization multiplexed systems are subject to polarization dependent effects (PDE's), such as Polarization Dependent Loss/gain (PDL), Polarization Mode Dispersion (PMD), and other types of well known effects. PDL in particular, is a form of signal degradation induced intrinsically by the physical characteristics of the fibre itself, and/or induced externally through transient changes in the polarization couplings along a fibre route.

Unfortunately, PDL does not affect the linearly and orthogonally polarizations equally, thus potentially resulting in significant performance variations between the two polarizations. For example, as shown in the plot of bit error rate (BER) vs signal-to-noise ration (SNR) of FIG. 3 for a dual polarization system, the horizontal (linear) polarization component 26 has lower BER vs SNR relationship than the vertical (orthogonal) polarization component 28. Hence the BER on each of the transmitted polarizations is different. In particular, the BER of signals transmitted over different polarizations can differ by orders of magnitude. System users typically set limitations on transmission power levels and BER. It is noted that BER can be improved by increasing the transmission power level, but this improvement is bounded by the limits on system transmission power levels. However, overall system performance is based on the worst case performance characteristics associated with each polarized component. As a result, the performance advantages of the orthogonal polarized component cannot be fully exploited.

It is, therefore, desirable to provide a method and system for improving performance of polarization multiplexed optical systems while minimizing the effects of PDL and minimizing modifications to the optical system infrastructure.

SUMMARY OF THE INVENTION

It is an object of the present invention to obviate or mitigate at least one disadvantage of previous dual-polarization optical communication systems. In particular, it is an object of the invention to mitigate PDL effects in dual-polarization optical communication systems.

In a first aspect, the present invention provides a method for interleaving data symbols of a plurality of incoming data streams onto a corresponding number of outgoing data streams in an optical system. The method includes receiving the plurality of incoming data streams in parallel; buffering a predetermined number of the data symbols corresponding to each of the plurality of incoming data streams; distributing each of the predetermined number of data symbols corresponding to one of the incoming data streams onto a different outgoing data stream in time; and repeating the step of distributing for the remaining incoming data streams.

According to embodiments of the present aspect, the step of receiving can include receiving one or more of the incoming data streams, and the step of distributing can include transmitting $1/n \times 100\%$ of each incoming data stream to each of n outgoing data streams. The step of receiving can include receiving four incoming data streams and the step of distributing can include transmitting through four outgoing data streams. The step of distributing can include transmitting each of the predetermined number of data symbols corresponding to the one incoming data stream at the same time. The step of distributing can include transmitting each of the predetermined number of data symbols corresponding to the one incoming data stream at staggered times. The incoming data streams can include multi-dimensional FEC codes having two or more constituent codewords for an incoming data stream, and the step of receiving can include receiving the two or more constituent codewords. The step of distributing can include transmitting approximately $1/n \times 100\%$ of each constituent codeword to each of n outgoing data streams, where n is an integer number greater than 1.

According to other embodiments of the present aspects, the plurality of incoming data streams and the corresponding number of outgoing data streams correspond to one wavelength transmission channel, or the plurality of incoming data streams can correspond to first and second wavelength transmission channels. In an aspect of the present embodiment, the step of distributing includes transmitting a portion of the incoming data streams corresponding to the first wavelength transmission channel onto an outgoing data stream corresponding to the second wavelength transmission channel, and transmitting a portion of the incoming data streams corresponding to the second wavelength transmission channel onto an outgoing data stream corresponding to the first wavelength transmission channel.

In a second aspect, the present invention provides a method for low error rate polarization multiplexed optical communications transmission. The method includes receiving a plurality of incoming data streams, each incoming data stream having corresponding data symbols; interleaving the data symbols corresponding to each of the plurality of incoming data streams onto different outgoing data streams; and generating at least one polarization multiplexed signal from the outgoing data streams for optical transmission.

According to embodiments of the present aspect, the step of receiving can include forward error encoding each of the plurality of incoming data streams, and the step of generating can include generating symbol mapped signals from the outgoing data streams; modulating the symbol mapped signals to provide modulated signals; polarizing the modulated signals into orthogonal signals; and multiplexing the orthogonal signals to provide the at least one polarization multiplexed signal.

According to other embodiments of the present invention, the step of interleaving can include the steps of receiving the plurality of incoming data streams in parallel; buffering a predetermined number of data symbols corresponding to each of the plurality of incoming data streams; distributing each of the predetermined number of data symbols corresponding to one incoming data stream onto the different outgoing data streams; and, repeating the step of distributing for the remaining incoming data streams. The step of distributing can include transmitting each of the predetermined number of data symbols corresponding to the one incoming data stream at the same time, or at staggered times.

According to yet another embodiment of the present invention, the plurality of incoming data streams includes first incoming data streams corresponding to a first wavelength transmission channel, and second incoming data streams corresponding to a second wavelength transmission channel. In the present embodiment, the outgoing interleaved data streams can include first outgoing interleaved data streams corresponding to the first wavelength transmission channel and second outgoing interleaved data streams corresponding to the second wavelength transmission channel. The step of interleaving can include the step of interleaving the data symbols corresponding to the first incoming data streams with the data symbols corresponding to the second incoming data streams, such that the first outgoing data streams include data symbols corresponding to the first and the second incoming data streams and the second outgoing data streams include data symbols corresponding to the first and the second incoming data streams. The step of generating can include generating a first polarization multiplexed signal corresponding to the first wavelength transmission channel and generating a second polarization multiplexed signal corresponding to the second wavelength transmission channel.

In a third aspect, the present invention provides a dual-polarization optical communication system for receiving a plurality of incoming data streams, each of the plurality of incoming data streams having corresponding data symbols. The dual-polarization optical communications system includes a data interleaver and a signal processing block. The data interleaver receives the plurality of incoming data streams, and distributes a predetermined number of the data symbols corresponding to each incoming data stream onto different outgoing data streams. The signal processing block converts the outgoing data streams into at least one single wavelength transmission signal having orthogonally polarized signal components.

In an embodiment of the present aspect, the data interleaver can include buffers for storing a predetermined number of data symbols corresponding to each of the plurality of incoming data streams, and a multiplexing circuit coupled to each of the buffers for receiving the predetermined number of data symbols corresponding to each incoming data stream, the multiplexing circuit driving the predetermined number of data symbols corresponding to each data stream onto the different outgoing data streams.

In another embodiment of the present aspect, the signal processing block can include symbol mapping logic for receiving the outgoing data streams and for generating a pair of symbol mapped signals, modulators for receiving each of the pair of symbol mapped signals for generating first and second optical signals, a polarizing circuit for receiving the first and the second optical signals for generating the orthogonally polarized signal components, and a polarization multiplexor for generating the at least one single wavelength transmission signal from the orthogonally polarized signal components. The symbol mapping logic can include a first symbol mapper for receiving a first pair of the outgoing data streams and for generating a first symbol mapped signal and a second symbol mapper for receiving a second pair of the outgoing data streams and for generating a second symbol mapped signal. The modulators can include a first modulator block for receiving the first symbol mapped signal and for generating the first optical signal, and a second modulator block for receiving the second symbol mapped signal and for generating the second optical signal. The polarizing circuit can include a horizontal polarizer for receiving the first optical signal and for generating a linearly polarized optical signal, and a vertical polarizer for receiving the second optical signal and for generating a horizontally polarized optical signal.

In yet another embodiment of the present aspect, the plurality of incoming data streams can include first incoming data streams corresponding to a first wavelength transmission channel, and second incoming data streams corresponding to a second wavelength transmission channel, and the outgoing data streams can include first outgoing data streams corresponding to the first wavelength transmission channel and second outgoing data streams corresponding to the second wavelength transmission channel. The data interleaver can include first buffers for storing a predetermined number of data symbols corresponding to each of the first incoming data streams, second buffers for storing the predetermined number of data symbols corresponding to each of the second incoming data streams, and a multiplexing circuit coupled to the first and the second buffers. The multiplexing circuit distributes a portion of the predetermined number of data symbols corresponding to the first incoming data streams onto the second outgoing data streams, and distributes a portion of the predetermined number of data symbols corresponding to the second incoming data streams onto the first outgoing data streams.

In the present embodiment, the signal processing block can include a first signal processing unit for receiving the first outgoing data streams, and for converting the first outgoing data streams into a first wavelength transmission signal, and a second signal processing unit for receiving the second outgoing data streams, and for converting the second outgoing data streams into a second wavelength transmission signal. The first signal processing unit can include symbol mapping logic for receiving the first outgoing data streams and generating a pair of symbol mapped signals, modulators for receiving the pair of symbol mapped signals for generating first and second optical signals, a polarizing circuit for receiving the first and the second optical signals for generating first orthogonally polarized signal components, and a polarization multiplexor for generating the first wavelength transmission signal from the first orthogonally polarized signal components. The second signal processing unit can include symbol mapping logic for receiving the second outgoing data streams and generating a pair of symbol mapped signals, modulators for receiving the pair of symbol mapped signals for generating first and second optical signals, a polarizing circuit for receiving the first and the second optical signals for generating second orthogonally polarized optical signals, and a polarization multiplexor for generating the second wavelength transmission signal from the second orthogonally polarized signal components.

According to another embodiment of the present aspect, the system can further include a receiver for receiving the at least one single wavelength transmission signal, and for extracting the incoming data streams from the at least one single wavelength transmission signal. The receiver can include a de-polarizer circuit for extracting the orthogonally polarized signal components from the at least one single wavelength transmission signal, optical-to-electrical converters for converting the orthogonally polarized signal components to the pair of symbol mapped signals, symbol de-mappers for receiving the pair of symbol mapped signals, and for generating the outgoing data streams, and a data de-interleaver for receiving the outgoing data streams and for re-assembling the received data symbols into the plurality of incoming data streams.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for averaging the effects of polarization distortions across a multitude of transmitted data streams in a dual polarization multiplexed optical communications system. Data streams are interleaved amongst each other in accordance with a predetermined pattern. The interleaved data streams are symbol mapped and modulated to provide a pair of optical signals. The pair of optical signals are orthogonally polarized, and multiplexed for transmission across an optical fibre. A receiver circuit receives the transmitted signal and extracts the interleaved data streams. The interleaved data streams are de-interleaved to generate the original data streams. While the data streams can be interleaved and transmitted via a single wavelength optical signal, the data streams can be interleaved and transmitted over two or more different wavelength optical signals to further mitigate the effects of polarization distortions.

Figure 4:
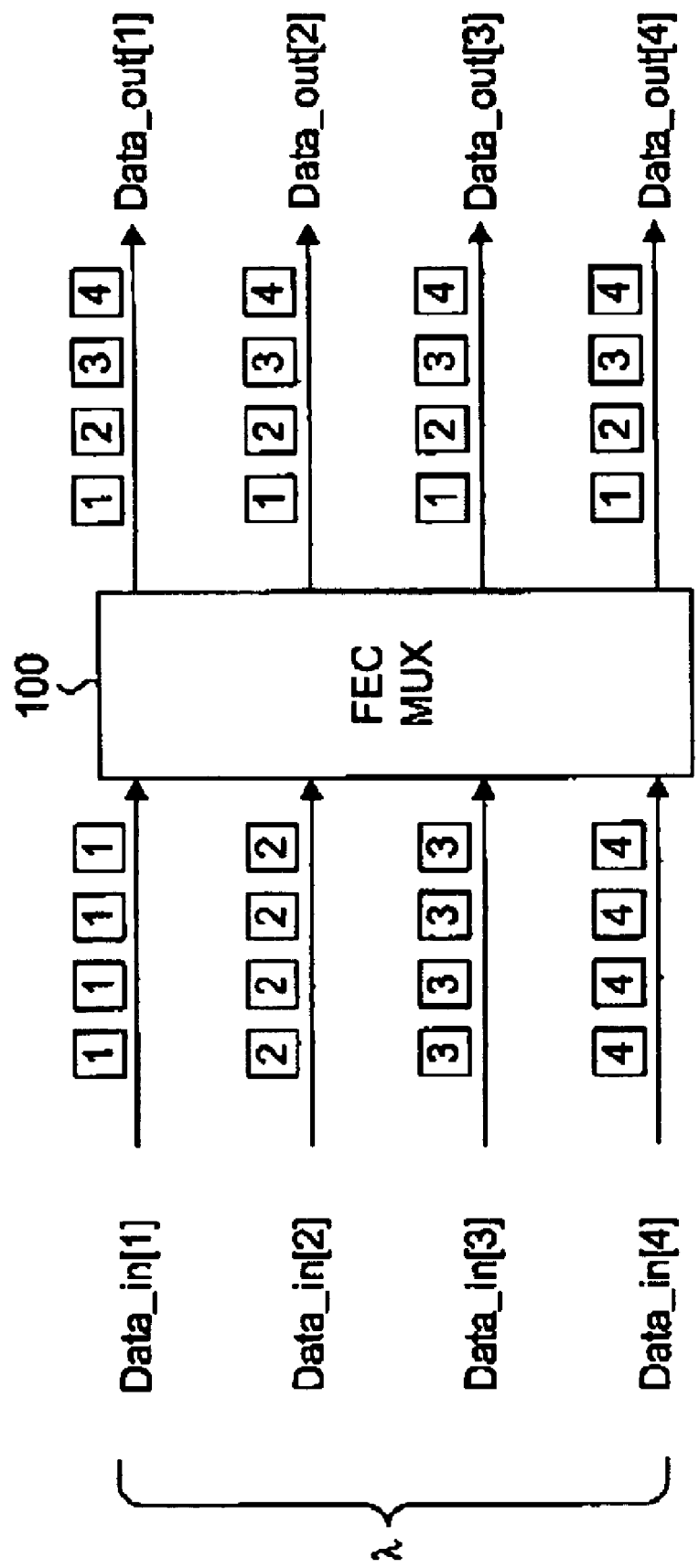
FIG. 4 is an illustration of the data stream interleaving operation according to an embodiment of the present invention.

FIG. 4 illustrates a data stream interleaving pattern according to an embodiment of the present invention. Generally, the data symbols of one or more incoming data streams are interleaved across a predetermined number of outgoing data streams. In FIG. 4, an FEC interleaver 100 transposes the data symbols of each incoming data stream onto different outgoing data streams. Incoming data streams Data_in[1], Data_In [2], Data_in[3] and Data_in[4] each provide their respective data symbols serially to FEC interleaver 100. FEC interleaver 100 then transposes each data symbol from one incoming data stream onto a different outgoing data stream. For example, data symbols "1" for Data_in[1] are transposed onto outgoing data streams Data_out[1], Data_out[2], Data_out [3] and Data_out[4]. The resulting interleaving pattern of the data symbols of each incoming data stream is shown in the outgoing data streams. Further details of data stream interleaving are described in U.S. patent application Ser. No. 09/722,339 filed on Nov. 28, 2000, the entire contents of which are incorporated herein by reference.

In principle, if there are n output channels, then approximately $1/n \times 100\%$ of the bits for each input channel should be transferred to each output channel. The (causal) ordering of the bits from each input channel are preferably maintained on the output channel in order to maintain the burst error capability of the FEC code. For multi-dimensional FEC codes such as turbo codes, turbo product codes and low density parity codes, that have two or more constituent codes, there is an additional requirement. For each constituent codeword, about $1/n \times 100\%$ of the bits should be transferred to each (of the n) output channels.

The embodiment shown in FIG. 4 is an example of a four data channel input scheme, where each incoming data stream is a 10.7 Gbps stream transmitted at 40 Gbps using dual-polarization (polarization multiplexed) QPSK or other 4-level modulation scheme. In an alternate embodiment of a 40 Gbps system, the data symbols of a single 40 Gbps data stream can be interleaved across the four outgoing data streams. In another alternate embodiment, two 20 Gbps data streams can have their data symbols interleaved across the four outgoing data streams. Those of skill in the art should understand that the embodiments of the present invention are not limited to 40 Gbps systems. For example, two 10.7 Gbps data streams can be transmitted at 20 Gbps using polarization multiplexed PSK, DPSK or some other 2-level modulation scheme. Similarly, higher data rates are possible. For example, eight 10.7 Gbps data streams can be transmitted at 80 Gbps using polarization multiplexed 16 QAM or some other 4-level modulation scheme.

Figure 1:
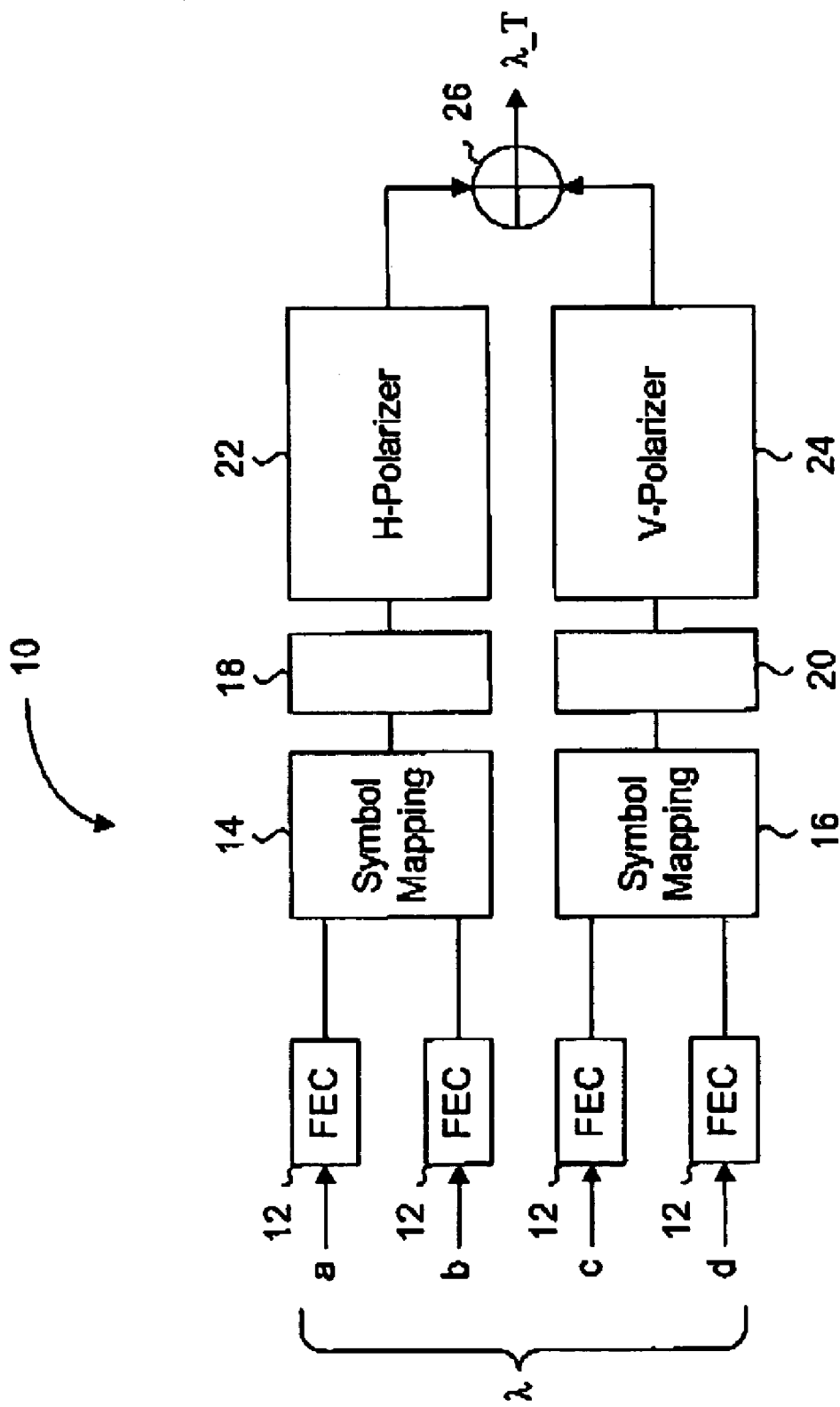
FIG. 1 is a block diagram of a dual polarization transmitter of the prior art.
Figure 2:
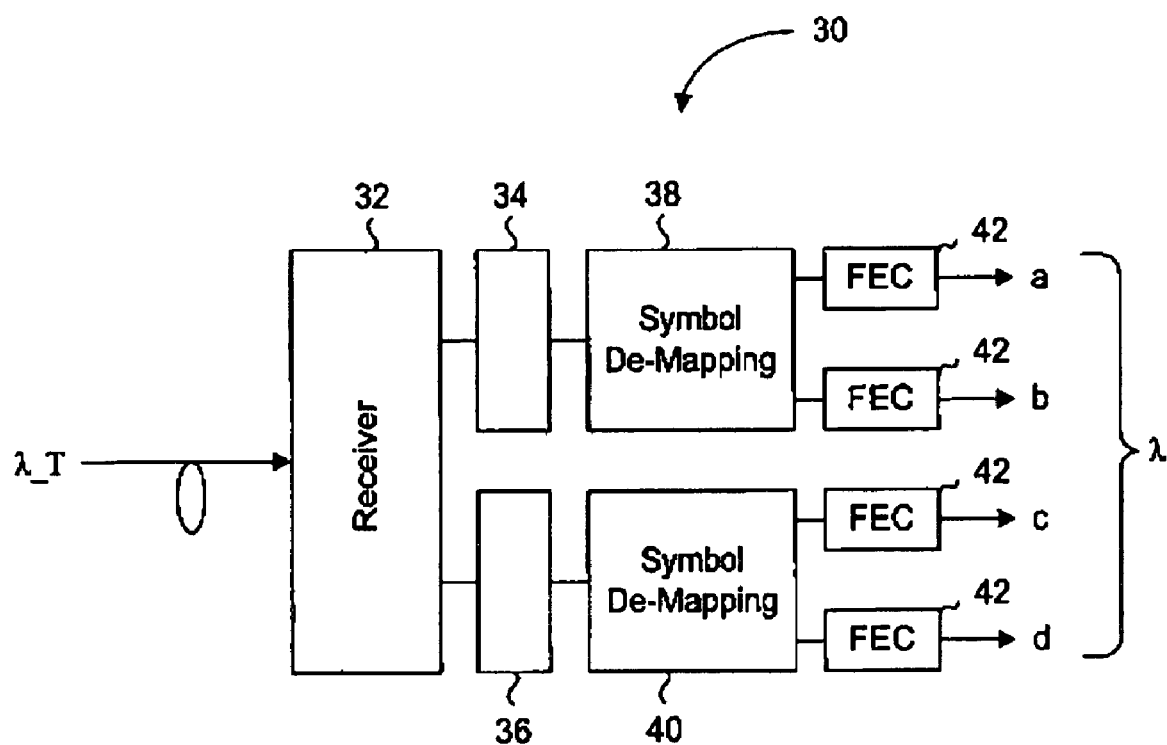
FIG. 2 is a block diagram of a dual polarization receiver of the prior art.
Figure 3:
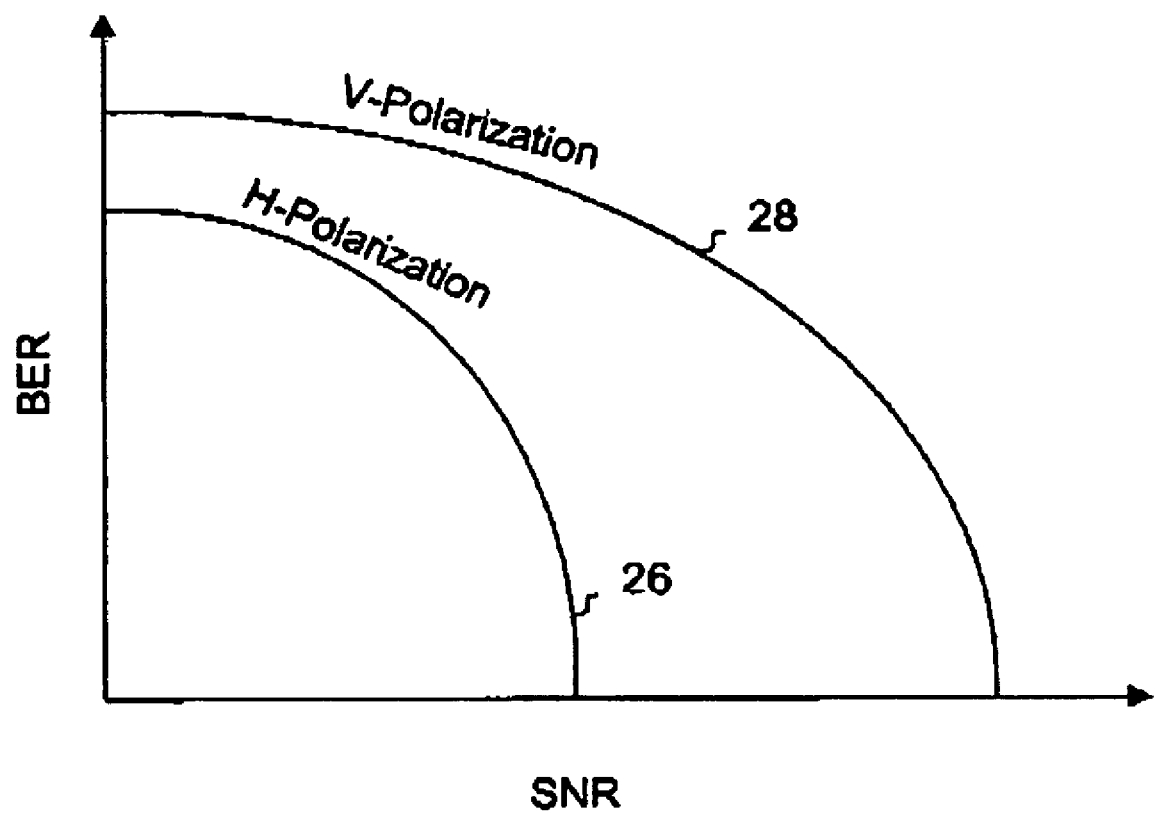
FIG. 3 is a graph plotting estimated BER vs SNR for dual polarization systems of the prior art.

By interleaving the data symbols of each data stream, the output error rate of the system is effectively averaged over all the data streams, resulting in an overall improvement in system performance. More specifically, instead of having distinct output error rates for the horizontal and vertical polarizations as shown in FIG. 3, the application of the embodiments of the present invention will provide a convergence of both the output error rates to a single common rate which represents an average between the previous worst and best case performance characteristics curves. Accordingly, the averaged rate is an improvement over the previous worst case performance characteristics, and the optical communication system can operate more efficiently for predetermined specifications by operating with less transmit power and/or BER.

Figure 5:
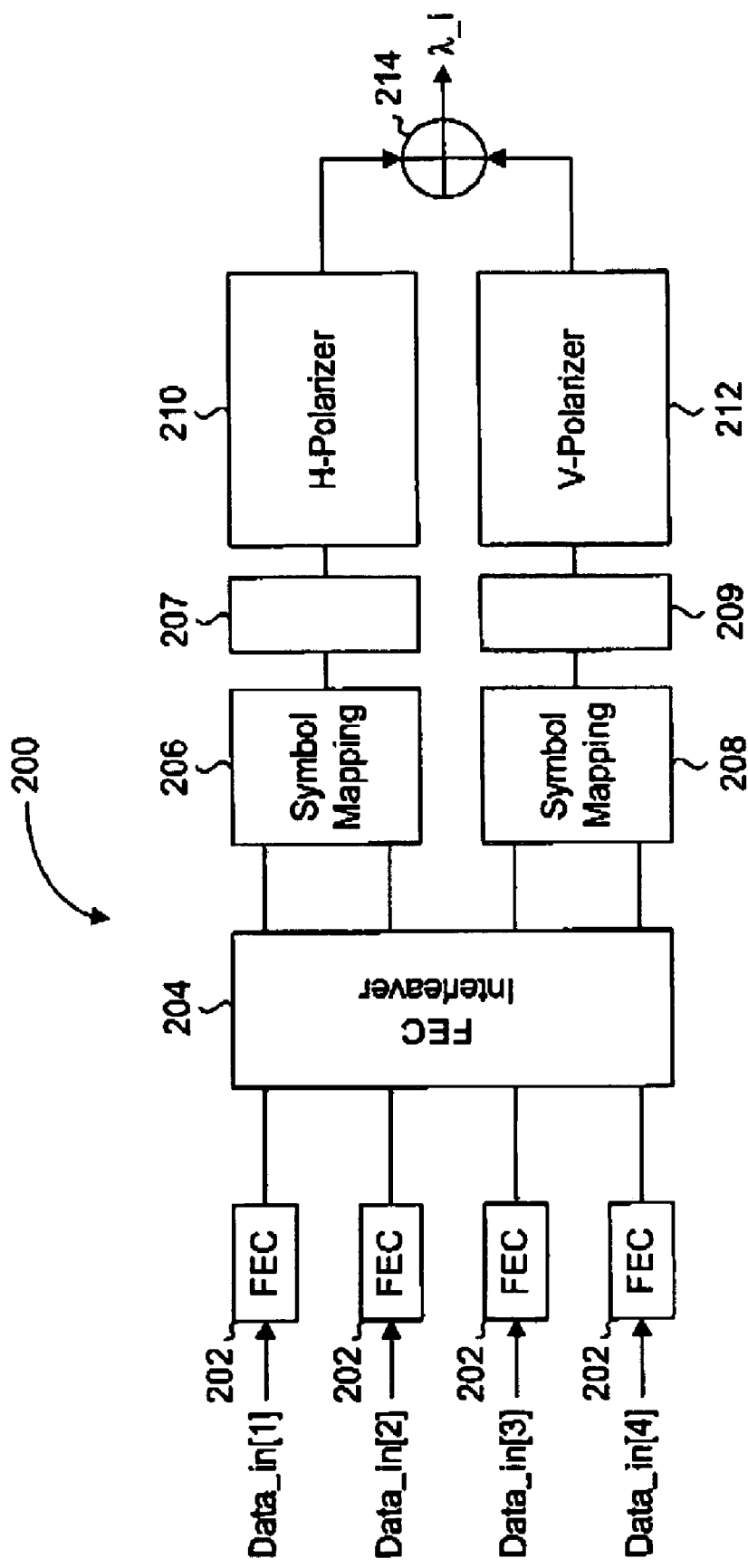
FIG. 5 is a block diagram of a data stream dual polarization transmitter according to an embodiment of the present invention.
Figure 6:
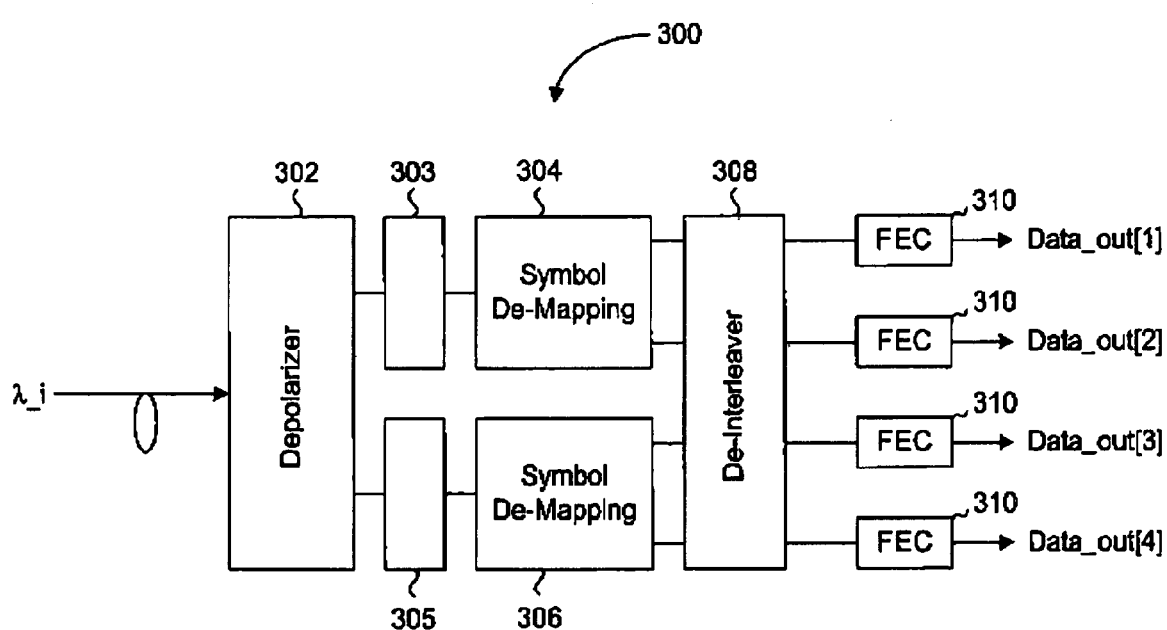
FIG. 6 is a block diagram of a data stream dual polarization receiver according to an embodiment of the present invention.

A dual-polarization transmitter according to an embodiment of the present invention is shown in FIGS. 5 and 6. The presently described embodiment is directed towards a 40 Gbps system configured for receiving four incoming data streams. As previously mentioned, the present embodiment is applicable to higher or lower data rate systems, with different numbers of incoming data streams. Furthermore, alternate systems can employ higher order modulations with more than 2-bits per data symbol.

Transmitter 200 of FIG. 5 receives four incoming data streams (Data_in[1] to Data_in[4]), which can be associated with a single wavelength to be transmitted, interleaves the data symbols from each stream amongst each other, and then polarizes the interleaved data streams into horizontal and vertical components for combination into at least one single wavelength transmission signal. The digital portion of transmitter 200 includes FEC encoder blocks 202, FEC interleaver 204 and symbol mapping logic 206, while the optical portion of transmitter 200 includes horizontal polarizer 210, vertical polarizer 212 and adder 214. Interfacing the digital and optical portions of transmitter 200 are modulators 207 and 209. Each incoming data stream can carry application specific information such as internet data or voice data for example. Incoming data streams [1]-[4] are fed to respective standard FEC encoder blocks 202. Each FEC encoder block 202 can have a rate of 10.7 Gbps for example, and be implemented in commercially available FEC application specific integrated circuits (ASIC). The encoded data streams are then received by FEC interleaver 204, where the data symbols of each data stream are distributed, or transposed onto all the outgoing data streams. It should be noted that symbol mapping logic 206, modulator 209, polarizers 210 and 212 and adder 214 form a signal processing block responsible for converting the outgoing data streams into an optical signal for transmission over an optical medium. This particular process will be described in further detail later.

Symbol mapping logic 206 receives a first pair of interleaved data streams from FEC interleaver 204 and provides a symbol mapped signal to modulator 207. Modulator 207 converts the signal from its electrical domain to the optical domain. The optical signal generated by modulator 207 is provided to horizontal polarizer 210. Similarly, symbol mapping logic 208 receives a second pair of interleaved data streams from FEC interleaver 204 and an optical signal is provided to vertical polarizer 212 via modulator 209. Horizontal polarizer 210 receives the signal from modulator 207, and converts the signal into linearly polarized QPSK symbols. Vertical polarizer 212 receives the signal from modulator 209, and converts the signal into vertically polarized QPSK symbols, which are orthogonal to the linearly polarized QPSK symbols. The resulting polarized signals are combined, or multiplexed together at adder 214 into a single wavelength transmission signal $\lambda\_i$. A clear advantage of the presently disclosed transmitter is the transparent nature of FEC interleaver 204. No modifications to the FEC encoders 202 or polarizers 210 and 212 is required, since FEC interleaver 204 receives the four encoded incoming data streams, and provides four interleaved data streams to the symbol mapping circuits 206 and 208. Therefore, little to no re-engineering and redesign of the transmitter is required.

The inclusion of symbol mapping circuits 206 and 208 is generally preferred for the systems shown in FIGS. 5 and 6, but are not necessary for systems limited to two incoming data streams and two outgoing data streams, which are transmitted using polarization multiplexing with two level modulation. Symbol mapping is done by taking two bits and mapping them to a QPSK phase constellation. Table 1 below illustrates an example of symbol mapping that can be employed for the embodiments of the present invention.

TABLE 1

| Data_out[1] | Data_out[2] | Carrier Phase |
|---|---|---|
| 0 | 0 | Pi/4 |
| 1 | 0 | 3pi/4 |
| 1 | 1 | 5pi/4 |
| 0 | 1 | 7pi/4 |

FIG. 6 is a block diagram of a dual-polarization receiver according to an embodiment of the present invention. The dual-polarization receiver 300 receives at least one single wavelength transmission signal, such as λ_i transmitted from dual-polarization transmitter 200 via an optical fibre, and extracts the original four data streams Data_in[1], Data_in[2], Data_in[3] and Data_in[4] for the receiving system. The optical portion of receiver 300 includes depolarizer 302, while the digital portion of receiver 300 includes symbol de-mapping logic 304 and 306, de-interleaver 308 and FEC decoders 310. Interfacing the digital and optical portions of receiver 300 are optical-to-electrical converters 303 and 305. Depolarizer circuit 302 receives λ_i and separates, or demultiplexes, the vertical and horizontal components of the signal. The depolarizing circuit 302 provides one symbol mapped output signal to optical-to-electrical converter 303, and another symbol mapped output signal to optical-to-electrical converter 305. The digital signal data streams generated by optical-to-electrical converters 303 and 305 are provided to symbol de-mapping logic 304 and 306, respectively. Symbol de-mapping logic 304 and 306 performs reverse mapping of the data streams received from optical-to-electrical converters 303 and 305, and provides the original four interleaved data streams. A de-interleaver 308 receives the four interleaved data streams and executes reverse-interleaving of the data based on the interleaving pattern executed by the FEC interleaver 204 of FIG. 5. Essentially, de-interleaver 308 re-assembles the interleaved data streams into their original FEC encoded data streams, for FEC decoding by FEC decoders 310. Each FEC decoder 310 provides original data streams, Data_in[1], Data_in[2], Data_in[3] and Data_in[4].

It should be noted that the data streams input to the de-interleaver 308 may experience differential delay due to Polarization Mode Dispersion, Chromatic Dispersion in the case of WDM or for other reasons. Therefore, some form of synchronization of the data streams is preferred to ensure optimal operation of receiver 300. Typically, the incoming data stream from the FEC encoder is organized into frames delineated by a unique Frame Alignment Word (FAW). Hence, a preferred function of the interleaver 204 is to detect the FAW of each input stream, frame align the multiple input streams and insert (or passthrough) a FAW for each outgoing data stream. On the receiving end, a preferred function of the de-interleaver 308 is to detect the FAW of each of its input streams and frame align the multiple input streams to correctly assign the bits to the outgoing data streams from the de-interleaver 308. A further discussion of frame alignment is presented in commonly assigned U.S. patent application Ser. No. 09/722,339 filed on Nov. 28, 2000, the entire contents of which are incorporated herein by reference.

Once again, the transparency of the modification to the receiver advantageously minimizes any re-engineering or redesign, since the de-interleaver 308 receives the four data streams from the symbol demapping logic 304 and 306 and then provides four data streams to the FEC decoders 310.

Figure 7:
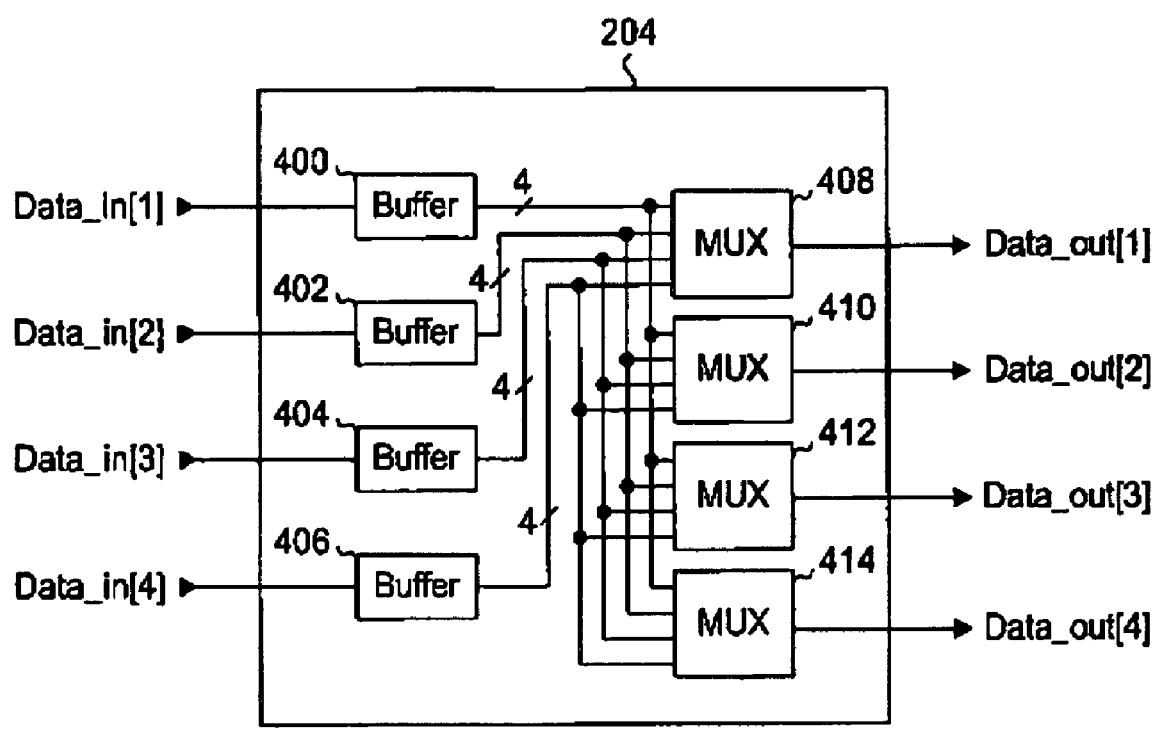
FIG. 7 is a block diagram of the interleaver of FIG. 5 according to an embodiment of the present invention.

FIG. 7 is a block diagram illustrating an example of implementation details of the FEC interleaver 204 shown in FIG. 5. Generally, FEC interleaver 204 includes two main circuit blocks. First is a buffer block for receiving and storing data symbols, which can include digital binary bits of signal data. Second is a multiplexing block for receiving the stored bits of signal data and distributing the digital bits of signal data across the output port. FEC interleaver 204 can include buffers 400, 402, 404 and 406 for receiving a respective incoming data stream and temporarily storing a predetermined number of data symbols of each data stream. Each buffer is coupled to each of four multiplexors 408, 410, 412 and 414 for transferring the buffered data symbols simultaneously to all multiplexors. More specifically, each buffer can be implemented as a four bit register, with an output line coupling each register to a different multiplexor. Therefore, each multiplexor 408, 410, 412 and 414 receives four bits of data, and through its multiplexing operation, passes one of the received bits of data onto its output port. While not shown, each multiplexor receives common selection control signals for selecting one of its four input ports to couple to the output port. Multiplexors 408, 410, 412 and 414 can be implemented as a single multiplexor circuit, and buffers 400, 402, 404 and 406 can be implemented as a single buffer circuit. The presently described FEC interleaver 204 in FIG. 7 should be understood to be a generalized implementation only, since any person skilled in the art will understand that different specific circuit configurations can be used to achieve the same desired result.

In general operation, buffers 400, 402, 404 and 406 receive and buffer data bits serially from their respective incoming data streams. Each buffer then provides four different bits at a time in parallel to an input port of each multiplexor. Multiplexors 408, 410, 412 and 414 can then be simultaneously controlled to pass the four bits corresponding to one incoming data stream onto outgoing data streams Data_out[1], Data_out[2], Data_out[3] and Data_out[4]. Thus, four bits of data serially received from one incoming data stream can be transposed onto four separate outgoing data streams at the same time. Those of skill in the art will understand that the circuit can be scaled to accommodate more or less incoming data streams and outgoing data streams.

Figure 8:
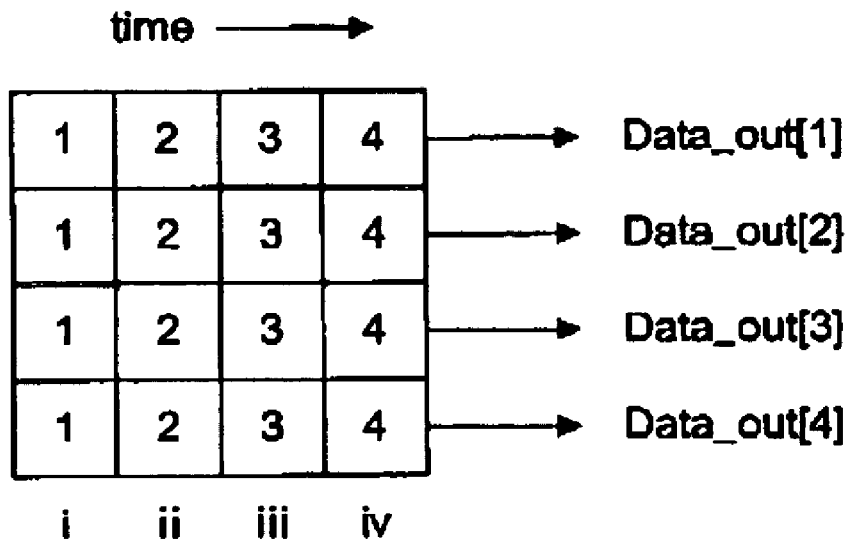
FIGS. 8 and 9 are tables illustrating four-data stream interleaving patterns according to embodiments of the present invention.

FIG. 8 illustrates a possible interleaved data stream output pattern resulting from interleaver 204. FIG. 8 shows the arrangement of the interleaved data symbols after four successive time periods i to iv have elapsed. As shown, all the data symbols from one incoming data stream are interleaved amongst the four outgoing data streams in the same time period.

Figure 9:
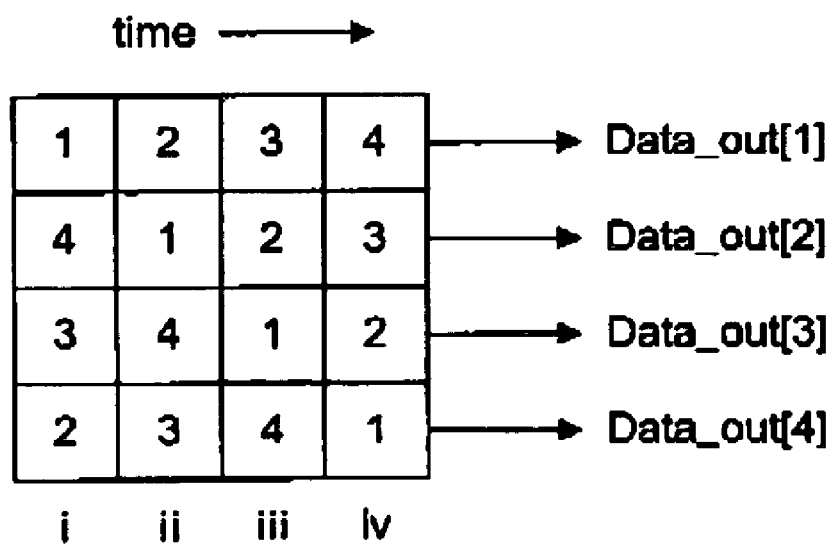

In an alternate embodiment, the data symbols from each incoming data stream can be interleaved in a time-staggered configuration, as shown in FIG. 9. For example, data symbols "1" from the same incoming data stream are interleaved onto a different outgoing data stream at different time periods. Of course, other time-staggered interleaving patterns can be used to obtain the same advantages in minimizing PDL of polarization multiplexed optical systems.

The previously described embodiments of the present invention are directed to an optical system for transmitting and receiving interleaved/orthogonally polarized data channels over a single wavelength transmission signal. According to another embodiment of the present invention, the data channels can be interleaved over multiple wavelength transmission signals and correspondingly transmitted and received.

Figure 10:
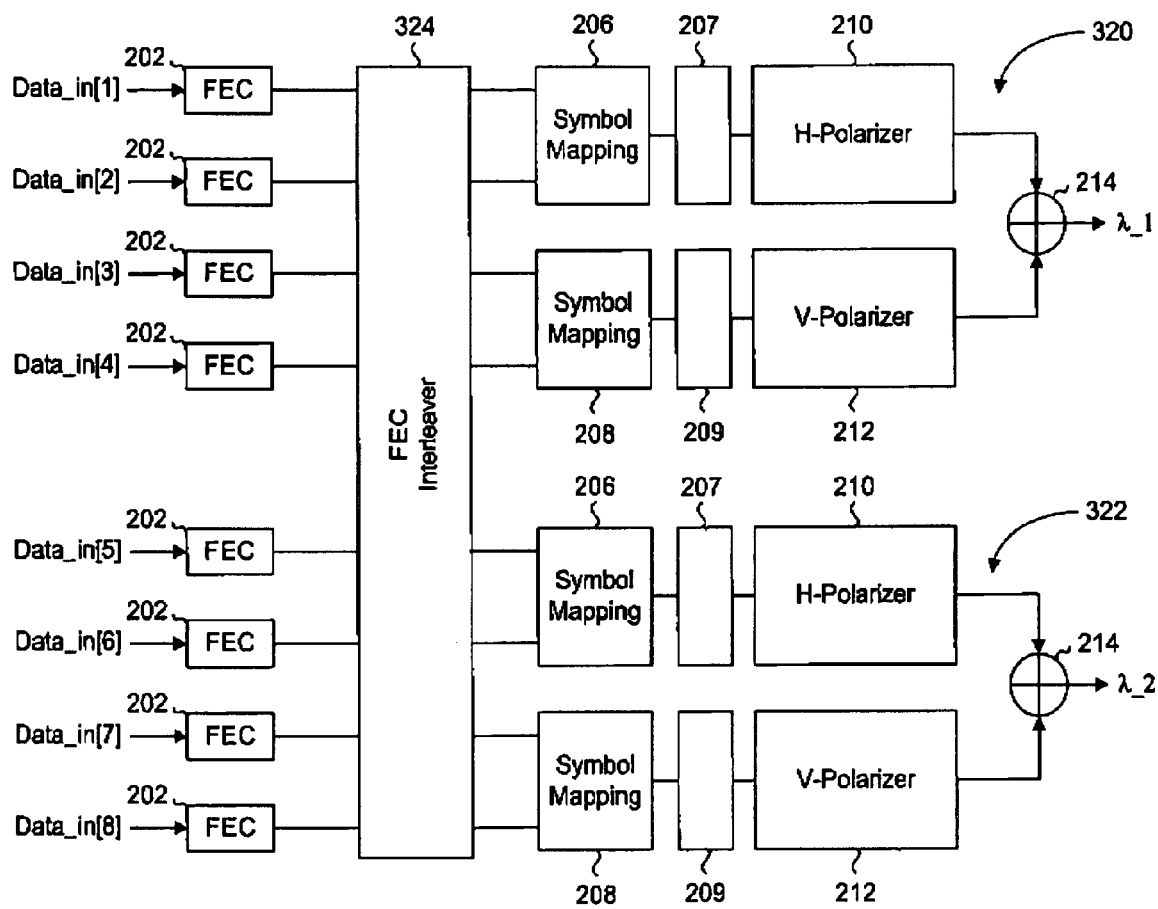
FIG. 10 is a block diagram of a multi-data stream dual polarization transmitter according to an embodiment of the present invention.

FIG. 10 shows two transmitter units 320 and 322, each including the same numbered components as transmitter 200 in FIG. 5. However, instead of individual interleavers for each transmitter, both transmitter units 320 and 322 share a single common interleaver 324. Common interleaver 324 functions similarly to interleaver 204 shown in FIG. 7. In the presently described embodiment, signals Data_in[1] to Data_in[8] are interleaved amongst each other to generate two sets of interleaved outgoing data streams, which are then independently polarized and transmitted over wavelength transmission signal $\lambda\_1$ and $\lambda\_2$. It is noted that the logical arrangement, or grouping, of the data streams is not relevant to the present embodiment of the invention.

Of course, those of skill in the art will understand that signals Data_in[1] to Data_in[4] can be originally associated with one specific wavelength transmission signal, while signals Data_in[5] to Data_in[8] can be originally associated with a different specific wavelength transmission signal. The principle concept being that the multitude of input data streams can be multiplexed over multiple wavelengths, and polarizations.

In a practical implementation of the present embodiment of the invention, the interleaver would require additional buffering to accommodate the different propagation delays inherent with signals of different wavelengths. Those of skill in the art should understand how to calculate and design for the appropriate delays.

Figure 11:
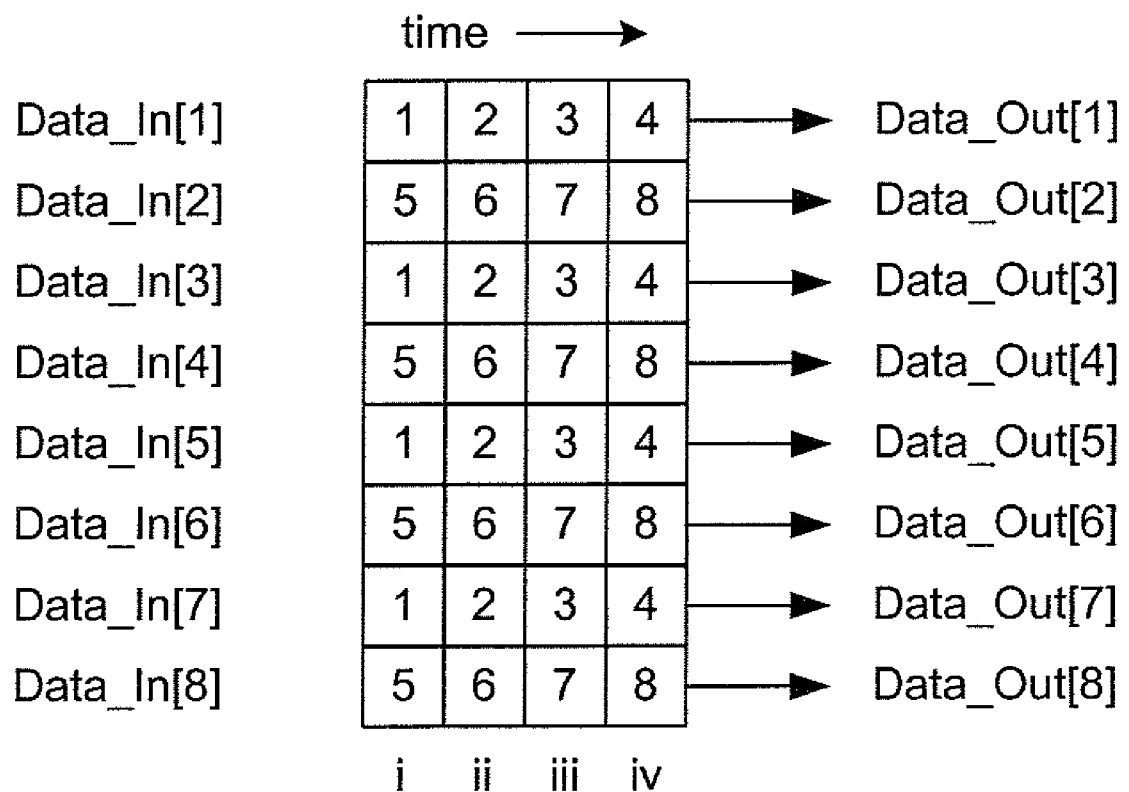
FIG. 11 is a table illustrating a data interleaving pattern executed by the common interleaver shown in FIG. 10.

FIG. 11 illustrates an interleaved data stream output pattern resulting from the interleaving operation executed by common interleaver 324. In the presently shown interleaving pattern, data bits from Data_in[1] to Data_out[4] are distributed across outgoing data streams Data_out[1], Data_out[3], Data_out[5] and Data_out[7], while data bits from Data_in [5] to Data_in[8] are distributed across outgoing data streams Data_out[2], Data_out[4], Data_out[6] and Data_out[8]. The presently shown distribution pattern is one example of many different distribution patterns that can be employed, for interleaving the data streams of the two channels. For example, instead of interleaving and transmitting the data symbols of incoming data streams in the same time period, the data symbols can be interleaved in a time-staggered arrangement.

Figure 12:
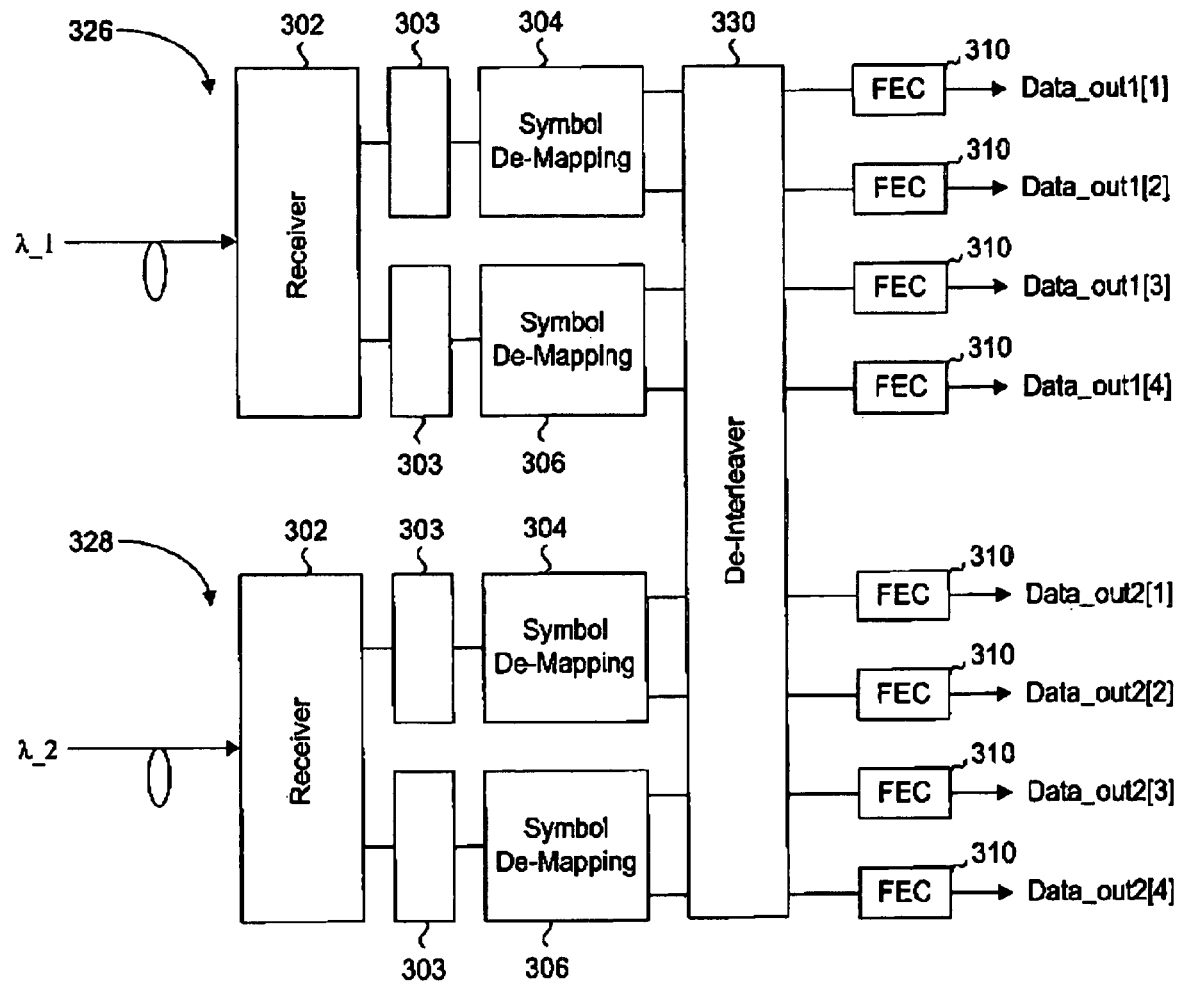
FIG. 12 is a block diagram of a multi-data stream dual polarization receiver according to an embodiment of the present invention.

FIG. 12 shows a corresponding receiver circuit, which includes a pair of receiver units 326 and 328, configured to receive the two wavelength transmission signals, $\lambda\_1$ and $\lambda\_2$, and extract their respective sets of data streams. Each receiver unit 326 and 328 includes the same components as dual polarization receiver 300, except that instead of having individual de-interleavers, both receivers 326 and 328 share a common de-interleaver 330. Common de-interleaver executes reverse-interleaving, or de-interleaving, of the data based on the interleaving pattern executed by common interleaver 324 of FIG. 10. As previously discussed, de-interleaver 330 can include alignment means for synchronizing the data streams.

The operation of the alternate system shown in FIGS. 11 to 13 is essentially the same as the system shown in FIGS. 5 and 6, and thus does not require further discussion. The system of FIGS. 5 and 6 performs local interleaving of the data streams, meaning that the data streams can be associated with a single wavelength transmission signal, and interleaved amongst each other. Since the system of FIGS. 11 to 13 can receive two sets of data streams, each set being associated with one wavelength transmission signal, local interleaving of the data streams within their respective sets of data streams, and global interleaving of the data streams between different sets of data streams, can be executed. Of course, those of skill in the art will understand that the system of FIGS. 11 to 13 is not limited to two transmitter units and two receiver units. Therefore, the output error rates associated with one wavelength transmission signal can be averaged across other wavelength transmission signals in the system.

Although the embodiment of the invention shown in FIGS. 11 and 13 share a common interleaver and de-interleaver respectively, common interleaver 324 and common de-interleaver 330 can be optionally configured to execute local interleaving functions for the data streams of one wavelength transmission signal only. In otherwords, common interleaver 324 can effectively operate as two independent interleavers such that no global interleaving is performed.

Figure 13A:
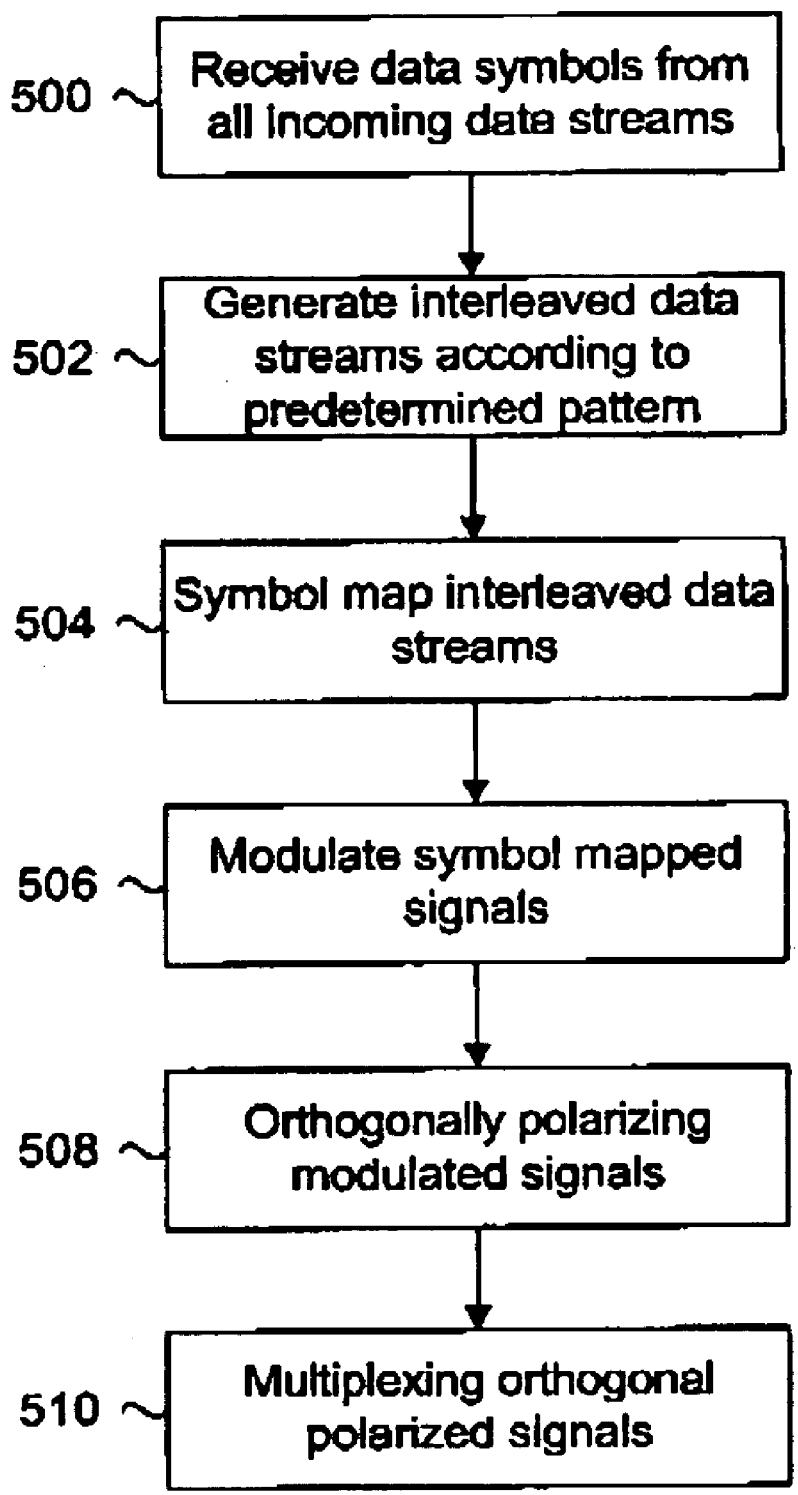
FIGS. 13a and 13b is a flow chart illustrating a method of dual polarization communication according an embodiment of the present invention; and, FIG. 14 is a graph plotting estimated BER vs SNR for the optical systems according to the embodiments of the present invention.
Figure 13B:
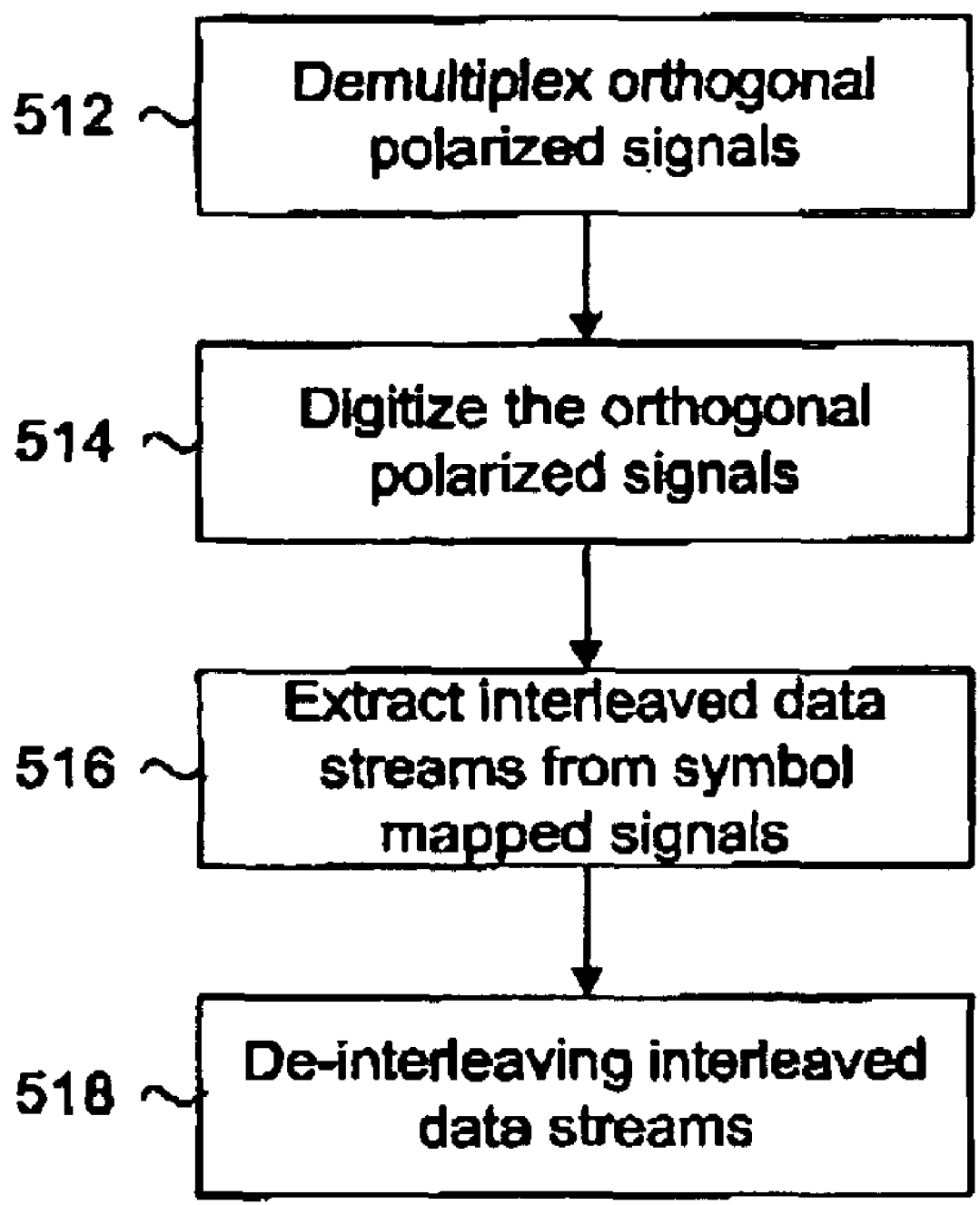

FIGS. 13a and 13b summarize the method of operation of the previously described transmitters and the receivers for dual-polarization optical communication, according to an embodiment of the present invention. The method starts at step 500, where the data streams are received by the transmitter, which are subsequently interleaved to generate outgoing interleaved data streams at step 502. As described for FIG. 12, the incoming data streams can be locally or globally interleaved. At step 504, the outgoing interleaved data streams are symbol mapped, such that there is one generated symbol mapped signal corresponding to a first polarization, and another generated symbol mapped signal corresponding to a second polarization orthogonal to the first. The symbol mapped signals corresponding to the first and second polarizations, are modulated, or converted to optical signals at step 506. The pair of optical signals are then polarized into their respective orthogonal polarizations at step 508, and then multiplexed and transmitted over an optical cable at step 510 in a single wavelength transmission signal.

In FIG. 13b, the single wavelength transmission signal is received and demultiplexed into its constituent orthogonal polarized components at step 512. At step 514, the polarized signals are converted into the symbol mapped digital signals. The symbol mapped digital signals corresponding to the orthogonal polarizations are symbol demapped at step 516, such that the interleaved data streams are extracted. These interleaved data streams are then de-interleaved in order to re-construct the original incoming data streams at step 518.

Figure 14:
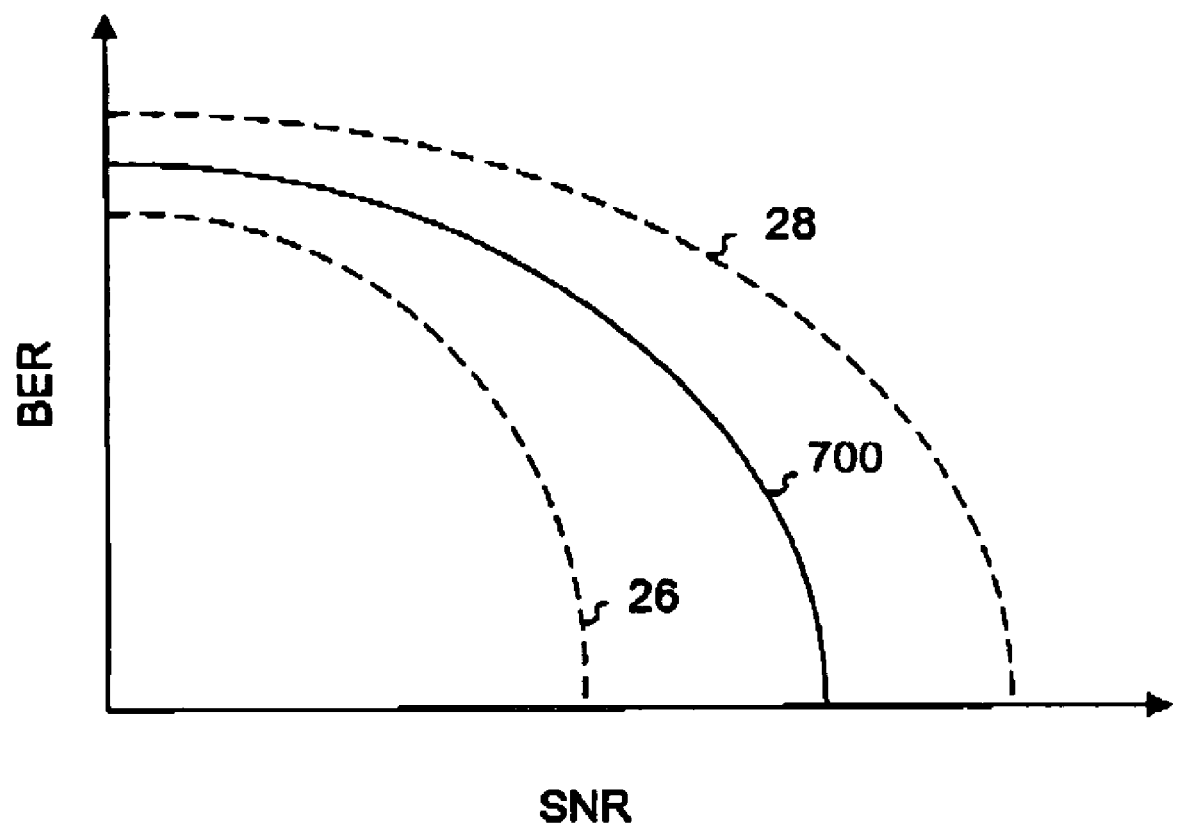

Therefore, the aforementioned embodiments of the present invention average the output error rate over all the outgoing data streams, such that the effective error rate of all the input data streams to the FEC decoders at the receiver are about the same, but superior to the worst-case error rate. FIG. 14 shows a graph superimposing the BER vs SNR characteristics for the system according to the embodiments of the present invention with those of the prior art previously shown in FIG. 3. By averaging the output error across all the outgoing data streams, the resulting error characteristics for each of the de-interleaved data streams converge to a single curve 700. Relative to the results previously shown in FIG. 3, the error rate has deteriorated relative to the horizontal component, but improved relative to the vertical component.

Hence, the worst case performance characteristics have improved, providing operating margins advantageous for the system user. For example, the transmitter/receiver can operate at a maximum BER specification with a lower power level than prior art systems, or the transmitter/receiver can operate at the maximum specified power level and provide a much lower BER than prior art systems. Furthermore, adapting current transmitter/receiver systems does not require substantive re-engineering of existing designs. In fact, existing components of current transmitter/receiver systems can be reused for the transmitter/receiver systems disclosed in the embodiments of the present invention.

While the previously described interleaver embodiments of the present invention illustrate an incoming data stream to outgoing data stream ratio of 1:1, an alternate interleaver can be configured to have a ratio of 1:2. For example, the alternate interleaver can receive one incoming data stream at a 10.7 Gbps data rate, but generate two 5.35 Gbps interleaved outgoing data streams that are polarization multiplexed and transmitted with 1 bit/symbol at a baud rate of 5.35 Gsymbols/s.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for low error rate polarization multiplexed optical communications transmission comprising:
   a) receiving a plurality of incoming data streams, each incoming data stream having corresponding data symbols;
   b) interleaving the data symbols of each incoming data stream onto a plurality of outgoing data streams; and,
   c) generating at least one polarization multiplexed optical signal from the plurality of outgoing data streams for optical transmission;
   wherein the step of interleaving includes the steps of:
      i) receiving the plurality of incoming data streams in parallel;
      ii) buffering a predetermined number of data symbols corresponding to each of the plurality of incoming data streams;
      iii) distributing each of the predetermined number of data symbols corresponding to one incoming data stream onto the different outgoing data streams; and,
      iv) repeating step iii) for the remaining incoming data streams;
   and wherein the incoming data streams include multi-dimensional FEC codes having two or more constituent codewords, and the step of receiving includes receiving the two or more constituent codewords for an incoming data stream, and the step of distributing includes transmitting approximately 1/n×100% of each constituent codeword to each of n outgoing data streams, where n is an integer number greater than 1.

2. The method of claim 1, wherein the step of receiving includes forward error encoding each of the plurality of incoming data streams.

3. The method of claim 1, wherein the step of interleaving includes
   detecting a frame alignment word corresponding to each of the plurality of incoming data streams,
   frame aligning each of the plurality of incoming data streams, and
   generating an outgoing frame alignment word for each of the different outgoing data streams.

4. The method of claim 3, wherein the step of generating an outgoing frame alignment word includes passing the frame alignment word corresponding to each of the plurality of incoming data streams to each of the different outgoing data streams.

5. The method of claim 3, wherein the step of generating an outgoing frame alignment word includes inserting the outgoing frame alignment word in each of the different outgoing data streams.

6. The method of claim 1, wherein the step of generating includes
   generating two symbol mapped data symbols from the outgoing data streams, each of the two symbol mapped data symbols corresponding to orthogonal polarizations of a single wavelength transmission signal;
   modulating the two symbol mapped data symbols to provide modulated signals;
   polarizing the modulated signals into orthogonal signals; and
   multiplexing the orthogonal signals to provide the polarization multiplexed signal.

7. The method of claim 1, wherein the step of receiving includes receiving one or more incoming data streams, and the step of distributing includes transmitting approximately 1/n×100% of each incoming data stream to each of n outgoing data streams, where n is an integer number greater than 1.

8. The method of claim 1, wherein the step of generating includes generating first and second polarization multiplexed signals from the outgoing data streams for optical transmission.

9. The method of claim 8, wherein the different outgoing data streams include
   first outgoing interleaved data streams corresponding to the first polarization multiplexed signal, and
   second outgoing interleaved data streams corresponding to the second polarization multiplexed signal.

10. The method of claim 9, wherein the step of generating includes
    generating two symbol mapped data symbols from the first outgoing interleaved data streams, each of the two symbol mapped data symbols corresponding to orthogonal polarizations of the first polarization multiplexed signal;
    modulating the two symbol mapped data symbols to provide modulated signals;
    polarizing the modulated signal into the orthogonal polarization of the first polarization multiplexed signal; and
    multiplexing the orthogonal polarizations to provide the first polarization multiplexed signal.

11. The method of claim 9, wherein the step of generating includes
    generating two symbol mapped data symbols from the second outgoing interleaved data streams, each of the two symbol mapped data symbols corresponding to orthogonal polarizations of the second polarization multiplexed signal;
    modulating the two symbol mapped data symbols to provide modulated signals;
    polarizing the modulated signals into the orthogonal polarizations of the second polarization multiplexed signal; and
    multiplexing the orthogonal polarizations to provide the second polarization multiplexed signal.

12. A dual-polarization optical communication system for receiving a plurality of incoming data streams, each of the plurality of incoming data streams having corresponding data symbols, the dual-polarization optical communications system comprising:
    a data interleaver for receiving the plurality of incoming data streams, the data interleaver distributing data symbols of each incoming data stream onto a plurality of outgoing data streams; and
    a signal processing block for converting the plurality of outgoing data streams into at least one single wavelength transmission signal having orthogonally polarized signal components;
    wherein the signal processing block includes:
       a first signal processing unit for receiving a first portion of the outgoing data streams, and for converting the first portion of the outgoing data streams into a first wavelength transmission signal having orthogonally polarized signal components, and a second signal processing unit for receiving a second portion of the outgoing data streams, and for converting the second portion of the outgoing data streams into a second wavelength transmission signal having orthogonally polarized signal components;

and wherein the first signal processing unit includes:

symbol mapping logic for receiving the first portion of outgoing data streams and generating a pair of symbol mapped signals, modulators for receiving the pair of symbol mapped signals for generating first and second optical signals, a polarizing circuit for receiving the first and the second optical signals for generating first orthogonally polarized signal components, and a polarization multiplexor for generating the first wavelength transmission signal from the first orthogonally polarized signal components.

13. The system of claim 12, wherein the data interleaver includes buffers for storing a predetermined number of data symbols corresponding to each of the plurality of incoming data streams, and a multiplexing circuit coupled to each of the buffers for receiving the predetermined number of data symbols corresponding to each incoming data stream, the multiplexing circuit driving the predetermined number of data symbols corresponding to each data stream onto the different outgoing data streams.

14. The system of claim 12, wherein the signal processing block includes symbol mapping logic for receiving the outgoing data streams and for generating a pair of symbol mapped signals, modulators for receiving each of the pair of symbol mapped signals for generating first and second optical signals, a polarizing circuit for receiving the first and the second optical signals for generating the orthogonally polarized signal components, and a polarization multiplexor for generating the at least one single wavelength transmission signal from the orthogonally polarized signal components.

15. The system of claim 14, wherein the symbol mapping logic includes a first symbol mapper for receiving a first pair of the outgoing data streams and for generating a first symbol mapped signal, and a second symbol mapper for receiving a second pair of the outgoing data streams and for generating a second symbol mapped signal.

16. The system of claim 15, wherein the modulators include a first modulator block for receiving the first symbol mapped signal and for generating the first optical signal, and a second modulator block for receiving the second symbol mapped signal and for generating the second optical signal.

17. The system of claim 16, wherein the polarizing circuit includes a horizontal polarizer for receiving the first optical signal and for generating a horizontally polarized optical signal, and a vertical polarizer for receiving the second optical signal and for generating a vertically polarized optical signal.

18. The system of claim 12, wherein the second signal processing unit includes symbol mapping logic for receiving the second portion of outgoing data streams and generating a pair of symbol mapped signals, modulators for receiving the pair of symbol mapped signals for generating first and second optical signals, a polarizing circuit for receiving the first and the second optical signals for generating second orthogonally polarized optical signals, and a polarization multiplexor for generating the second wavelength transmission signal from the second orthogonally polarized signal components.

* * * * *